US010903783B2

(12) United States Patent
Arliaud et al.

(10) Patent No.: US 10,903,783 B2
(45) Date of Patent: Jan. 26, 2021

(54) METHOD FOR PREDICTIVE CONTROL OF THE ORIENTATION OF A SOLAR TRACKER

(71) Applicant: NEXTracker Inc., Fremont, CA (US)

(72) Inventors: Jérôme Arliaud, Rousset (FR); Adrien Crucifix, Marseilles (FR); Philippe Blanc, Vence (FR)

(73) Assignee: NEXTracker Inc., Fremont, CA (US)

( * ) Notice: Subject to any disclaimer, the term of this patent is extended or adjusted under 35 U.S.C. 154(b) by 0 days.

(21) Appl. No.: 16/748,749

(22) Filed: Jan. 21, 2020

(65) Prior Publication Data
US 2020/0235696 A1 Jul. 23, 2020

Related U.S. Application Data

(63) Continuation of application No. 15/577,428, filed as application No. PCT/FR2016/051297 on May 31, 2016, now Pat. No. 10,541,644.

(30) Foreign Application Priority Data

Jun. 3, 2015 (FR) ...................................... 15 55063

(51) Int. Cl.
H02S 20/32 (2014.01)
F24S 25/12 (2018.01)
(Continued)

(52) U.S. Cl.
CPC .............. H02S 20/32 (2014.12); F24S 25/12 (2018.05); F24S 30/425 (2018.05); F24S 50/00 (2018.05);
(Continued)

(58) Field of Classification Search
CPC ......... H02S 20/32; F24S 30/425; F24S 50/80; F24S 50/20; F24S 50/00; F24S 25/12; G05B 15/02
See application file for complete search history.

(56) References Cited

U.S. PATENT DOCUMENTS 8,369,999 B2 2/2013 Beck
2007/0084502 A1 4/2007 Kelly et al.
(Continued)

FOREIGN PATENT DOCUMENTS

CN 101292361 A 10/2008
DE 202011104051 U1 1/2012
(Continued)

OTHER PUBLICATIONS

International Search Report dated Aug. 12, 2016 re: Application No. PCT/FR2016/051297; pp. 1-3; citing: US 2011/158467 A1, US 2011/220091 A1, US 2010/139644 A1, US 2013/048048 A1, US 2010/294337 A1, US 8 369 999 B2, US 2011/282514 A1, EP 2 645 135 A1, JP 2007 184354 A1, US 2013/152997 A1 and US 2014 083413 A.
(Continued)

Primary Examiner — Jayne L Mershon
(74) Attorney, Agent, or Firm — Weber Rosselli & Cannon LLP

(57) ABSTRACT

A method for controlling the orientation of a single-axis solar tracker orientable about an axis of rotation, including
observing the evolution over time of the cloud coverage above the solar tracker;
determining the evolution over time of an optimum inclination angle of the solar tracker substantially corresponding to a maximum of solar radiation on the solar tracker, depending on the observed cloud coverage;
predicting the future evolution of the cloud coverage based on the observed prior evolution of the cloud coverage;
calculating the future evolution of the optimum inclination angle according to the prediction of the future evolution of the cloud coverage;
servo-controlling the orientation of the solar tracker according to the prior evolution of the optimum incli-
(Continued)

nation angle and depending on the future evolution of the optimum inclination angle.

17 Claims, 7 Drawing Sheets

(51) Int. Cl.
*F24S 50/20* (2018.01)
*F24S 30/425* (2018.01)
*F24S 50/80* (2018.01)
*F24S 50/00* (2018.01)
*G05B 15/02* (2006.01)

(52) U.S. Cl.
CPC .............. *F24S 50/20* (2018.05); *F24S 50/80* (2018.05); *G05B 15/02* (2013.01); *Y02E 10/47* (2013.01)

(56) References Cited

U.S. PATENT DOCUMENTS

| | | |
|---|---|---|
| 2010/0139644 A1 | 6/2010 | Schwarzbach et al. |
| 2010/0294337 A1 | 11/2010 | Sherman et al. |
| 2011/0083718 A1 | 4/2011 | Wichner |
| 2011/0158467 A1* | 6/2011 | Lai .................... H02S 20/30 382/100 |
| 2011/0220091 A1* | 9/2011 | Kroyzer .................. F24S 50/20 126/572 |
| 2011/0282514 A1 | 11/2011 | Ropp et al. |
| 2013/0048048 A1 | 2/2013 | Flanery et al. |
| 2013/0152997 A1 | 6/2013 | Yao et al. |
| 2013/0256506 A1 | 10/2013 | Xu |
| 2014/0083413 A1 | 3/2014 | Bibi et al. |

FOREIGN PATENT DOCUMENTS

| | | |
|---|---|---|
| EP | 2645135 A1 | 10/2013 |
| JP | 2007184354 A | 7/2007 |
| WO | 9313396 A1 | 7/1993 |

OTHER PUBLICATIONS

Preliminary Search Report and Written Opinion issued in French Patent Application No. 1902956 dated Sep. 16, 2019, 7 pages. No English translation available.
U.S. Office Action issued in U.S. Appl. No. 15/577,428 dated Dec. 14, 2018, 24 pages.
Extended European Search Report issued in European Patent Application No. 20151750.5 dated Mar. 11, 2020 with English machine translation.
Brazilian Office Action issued in Brazlian Patent Application No. BR112017027598-8 dated May 20, 2020.
Chinese Office Action issued in Chinese Patent Application No. 201680037999.4 dated Jul. 9, 2020, with English translation, 16 pages.
Indian Office Action issued in Indian Patent Application No. 201717043221 dated May 1, 2020, 7 pages.
Brazilian Office Action issued in Brazilian Patent Application No. BR112017025863-3 dated Jul. 7, 2020, with English translation of relevant parts.

\* cited by examiner (8a)

(8b)

(8c)

(8d)

METHOD FOR PREDICTIVE CONTROL OF THE ORIENTATION OF A SOLAR TRACKER

FIELD

The present invention relates to a method for controlling the orientation of a single-axis solar tracker, as well as a single-axis solar tracker designed to implement such a method.

The invention concerns the field of solar trackers, also called tracker support systems, provided to support solar collectors, generally of the photovoltaic panel type.

More particularly, it concerns the solar trackers of the single-axis type that is to say orientable according to one single main axis of rotation, for a rotation allowing tracking the Sun during its rise and its descent from east to west. For accuracy, such a main axis of rotation generally extends horizontally and substantially parallel to the ground on which the solar tracker is anchored.

BACKGROUND

In this field, it is common to servo-control the orientation of the solar tracker based on an astronomical calculation of the position of the Sun, for a real-time positioning facing the Sun.

However, this servo-control type has a major drawback by offering a yield deficit under certain meteorological conditions, and we will advantageously refer to FIG. 1 for explanation; this FIG. 1 including four diagrams (1a), (1b), (1c) and (1d) each illustrating two solar trackers ST under different meteorological conditions, and with the Sun SO always at the same position.

The diagram (1a) illustrates ideal meteorological conditions, in the absence of clouds, and the solar trackers ST are orientated facing the Sun SO in order to benefit from a maximum direct solar radiation Rdir. Under these optimum conditions with a zero-cloud coverage, the servo-control on the position of the Sun SO provides a maximum operation; such a servo-control corresponding to a servo-control of the orientation of the solar tracker at an inclination angle called direct inclination angle defined by the direction of the direct solar radiation Rdir at the solar tracker.

The diagrams (1b), (1c) and (1d) illustrate degraded meteorological conditions, with different cloud coverages depending in particular on the cloudy surface or overcast surface, on the types of present clouds NU, on the number and the position of the clouds NU in front of the Sun SO.

Under such cloudy conditions, the servo-control on the position of the Sun SO may not provide the best yield, when not considering the diffuse solar radiation Rdif. The diffuse solar radiation Rdif arises when the direct solar radiation Rdir is dispersed in the clouds NU and the atmospheric particles. The diffuse solar radiation Rdif results from the diffraction of light by the clouds NU and by the various molecules in suspension in the atmosphere. Hence, the diffuse solar radiation Rdif does not necessarily follow the direction defined by the Sun SO in the direction of the observation point at the Earth's surface.

Consequently, under cloudy conditions, it may be preferable, in order to obtain a maximum yield with regards to these conditions, to orientate the solar trackers ST in an orientation called indirect or diffuse orientation according to a direction of the diffuse solar radiation Rdif which does not necessarily correspond to the direction of the direct solar radiation Rdir; such a servo-control corresponding to a servo-control of the orientation of the solar tracker on an inclination angle called diffuse inclination angle defined by the direction of the diffuse solar radiation Rdif at the solar tracker.

In the diagrams (1b), (1c) and (1d), all the solar trackers ST are precisely orientated according to diffuse inclination angles distinct from the direct inclination angle, in order to offer an optimum yield.

Thus, those skilled in the art would be inclined to servo-control, in real-time, the orientation of the solar tracker on an optimum inclination angle corresponding to a maximum solar radiation. In the absence of clouds, the optimum inclination angle would correspond to the direct inclination angle and, in the presence of a cloudy coverage and even one single cloud in front of the Sun, the optimum inclination angle would correspond to a diffuse inclination angle. For this purpose, it would be sufficient to measure the magnitude of the radiation at different directions, and establish the direction corresponding to a maximum magnitude in order to deduce the optimum inclination angle therefrom.

However, proceeding in this manner would have numerous drawbacks, all of them relating to the variation of the diffuse solar radiation over time. Indeed, depending on the time evolution of the cloud layer (because of the displacement of the clouds under the effect of the winds) and depending on the composition of this cloud layer (number, dimensions, location and types of clouds), the diffuse solar radiation may vary more or less rapidly and therefore the optimum inclination angle may vary more or less quickly over time.

Thus, by servo-controlling the orientation of the solar tracker at this optimum inclination angle, the solar tracker may be brought to change its orientation more or less frequently and more or less quickly. Yet, each orientation change urges at least one actuator (an electric motor in general), generating an electrical consumption and wear of the mechanical members loaded by the orientation change (bearings, rotation guide elements . . . ). These electrical consumptions and these wears will not necessarily be compensated by the gains in productivity when switching in real-time to the optimum inclination angle.

As example, starting from an initial situation where the optimum inclination angle corresponds to the direct inclination angle, because of the absence of clouds between the Sun and the solar tracker, if one single cloud passes in front of the Sun for a few minutes, the optimum inclination angle will be modified during these few minutes before returning afterwards to the direct inclination angle. In this case, servo-controlling in real-time the orientation of the solar tracker on the optimum inclination angle would lead to displacing the solar tracker during these few minutes, for a benefit which is certainly very little with regards to the electrical consumption of the actuator(s) and to the wear.

SUMMARY

The present invention aims at solving these drawbacks by proposing a method for controlling the orientation of a single-axis solar tracker, implementing a step of prediction of the evolution of the cloud coverage in order not to systematically servo-control the orientation of the solar tracker on the optimum inclination angle, but to anticipate the evolution of this optimum inclination angle to apply an advantageous trade-off between the gains in solar energy productivity and the electrical energy losses of the actuator(s), and possibly by taking into account the wear generated by the orientation changes.

To this end, it proposes a method for controlling the orientation of a single-axis solar tracker orientable about an axis of rotation, said method implementing the following steps:

a) observing the evolution over time of the cloud coverage above the solar tracker, by observing the cloud coverage at several consecutive instants by means of an observation system of the sky above the solar tracker;

b) translating each observation performed by the observation system into a mapping of the solar luminance and determining the evolution over time of an optimum inclination angle of the solar tracker corresponding substantially to the maximum solar radiation on the solar tracker, depending on the observed cloud coverage, by calculating for each mapping at each instant an optimum inclination angle associated to the maximum solar luminance on said mapping;

c) predicting the future evolution of the cloud coverage based on the prior observed evolution of the cloud coverage, by calculating at each present instant at least a predictive mapping of the solar luminance at a future instant, by implementing a predictive calculation taking into account an evolution of the distribution of the solar luminance on the mappings established at several past instants and a speed of evolution of the solar luminance between said mapping established at several past instants;

d) calculating the future evolution of the optimum inclination angle depending on the prediction of the future evolution of the cloud coverage, by calculating for each predictive mapping a predictive optimum inclination angle at a future instant associated to the maximum of the solar luminance on said predictive mapping;

e) servo-controlling the orientation of the solar tracker depending on the prior evolution of the optimum inclination angle and depending on the future evolution of the optimum inclination angle.

Thus, the method implements a prediction, in the relatively short term, of the future evolution of the optimum inclination angle; it should be recalled that this optimum inclination angle corresponding to the inclination angle of the solar tracker which offers the highest solar luminance depending on the cloud coverage, this optimum inclination angle may correspond to either the direct inclination angle (in particular in the absence of clouds, or at least in the absence of cloud between the Sun and the solar tracker), or to a diffuse inclination angle which will depend on the comparison of the cloud layer (number, dimensions and types of clouds, location of clouds, cloudy surface).

Then, depending on the future evolution of the optimum inclination angle, a servo-control of the orientation of the solar tracker can be implemented by anticipation, without following directly and in real-time the optimum inclination angle, thus allowing avoiding orientation changes which would result in a in little energy gain, and even which would result in energy losses, as it would be the case for example if one single cloud passes in front of the Sun for a reduced time.

Furthermore, the observation of the cloud coverage is translated into a mapping of the solar luminance and this mapping is used to determine the optimum inclination angle. The mapping corresponds, indeed, to a distribution of the luminance according to several elevation angles (angles generally measured relative to a vertical axis, these elevation angles are to be directly matched to the inclination angle of the solar tracker), and the research for the optimum inclination angle corresponds to the research for an elevation angle associated to the maximum solar luminance in the mapping.

It is possible to consider that the mapping is unidimensional, in other words with a distribution of the luminance only according to several elevation angles, or the mapping may be bidimensional in other words with a distribution of the luminance according to several elevation angles and also according to several azimuth angles (thus allowing taking into account the width of the solar collector—dimension taken along a direction orthogonal to the axis of rotation—and not only the length of the solar collector—dimension taken along the direction of the axis of rotation—).

Thus, observation of the cloud coverage is converted into a mapping of the solar luminance received by an observation system, this solar luminance varying according to the observation angle. Over time, the mappings allow observing the evolution of the solar luminance (directly dependent on the evolution of the cloud layer) and then establishing cartographic predictions on the future state of the mapping of the solar luminance, and therefore the inclination angle which would allow the solar tracker to benefit, in the future, from a maximum luminance.

According to another feature, during step a), each mapping is a bidimensional mapping established according to two directions, a first and a second directions, and, during step b), the optimum inclination angle is calculated for each mapping by implementing the following steps:

1 the mapping constitutes a solar luminance map distributed according to strips parallel to the first direction and associated respectively to different elevation angles and according to columns parallel to the second direction and associated respectively to different azimuth angles, to each strip accordingly corresponding an inclination angle of the solar tracker;

calculating for each strip an equivalent luminance value from the set of luminance values taken in the strip;

calculating for each strip a luminance value perceived by the tracker (1) support from equivalent luminance values calculated for the set of strips and from inclination angles associated to the strips;

retaining the optimum inclination angle as the inclination angle associated to the strip having the highest perceived luminance value.

In this manner, the calculation of the optimum inclination angle is based on the calculation of perceived luminance values associated to each strip and thus to each inclination angle.

Advantageously, the first direction is parallel to the axis of rotation of the solar tracker and the second direction is horizontal and orthogonal to the first direction.

Furthermore, the observation of the cloud coverage can be carried out according to any of the following methods:

sky images pickup from the ground by means of an image pickup apparatus, such as a camera;

measurement of the solar luminance from the ground by means of a set of several photosensitive cells;

recovery of satellite images from the sky above the solar tracker.

With an image pickup, the observation corresponds to an image. With a measurement of the solar luminance by photosensitive cells, the observation corresponds to a matrix of the measurements performed individually by each photosensitive cell, these photosensitive cells being positioned at different elevation angles, and in particular distributed on a full dome shaped support in order to provide a wide observation from the sky. With a recovery of satellites images, the observation corresponds to a satellite image of the concerned area.

According to an advantageous feature, during step b), is implemented a step of frequency weighting applied on the observation which depends on both a frequency response of the observation system and on the useful frequency band of the solar collector.

Thus, the frequency weighting will consist in applying a frequency filter which will take into account the spectral response of the solar collector.

In a particular embodiment, to carry out step a), the cloud coverage is observed periodically for several consecutive instants, the instant t corresponding to the present instant and the duration P corresponding to the time period between two consecutive observations, so that at each instant t is associated a mapping;

to carry out step c), at each present instant t, at least a predictive mapping at a future instant t+nP, where n is non-zero integer, is calculated at least from the mappings established at several past instants t−mP, where m is a non-zero integer;

to carry out step d), for each predictive mapping at a future instant t+nP is calculated a predictive optimum inclination angle (θopt).

Advantageously, during step d), the optimum inclination angle for the predictive mapping is calculated according to a calculation method equivalent to that used during step b) for calculating the optimum inclination angle for a mapping.

In other words, the same type of calculation is implemented to determine the optimum inclination angle, whether for observations actually performed or for the predictions which are derived from a predictive calculation in order to improve a match between calculations.

According to one possibility of the invention, during step e), the servo-control of the orientation of the solar tracker is also carried out according to the energy consumption necessary to modify the orientation of the solar tracker starting from a present inclination angle until reaching a predictive optimum inclination angle established at a future instant during step d).

In other words, the effective servo-control takes into account this energy consumption to implement or not an orientation according to a future (or predictive) optimum inclination angle in order to anticipate a change in cloud coverage.

In accordance with another feature of the invention, during step e), is established a potential scenario during which the inclination angle of the solar tracker is modified starting from a present inclination angle until reaching a predictive optimum inclination angle at a future instant established during step d), and to this potential scenario are associated the calculations of:

the evolution of the inclination angle of the solar tracker during the orientation change starting from a present inclination angle until reaching a predictive optimum inclination angle, this evolution depending on the speed of displacement in rotation of the solar tracker;

the evolution of the energy consumption necessary to modify the orientation of the solar tracker;

the evolution of the additional solar energy production expected with such an orientation change;

the evolution of the expected energy yield based on the difference between the solar energy production and the energy consumption;

then the orientation of the solar tracker is servo-controlled on said predictive optimum inclination angle if the energy yield is generally positive for the scenario, else the orientation of the solar tracker is held at the present inclination angle.

Thus, the servo-control according to such a predictive (or future) inclination angle will be performed only under an energy benefit, in order not to implement systematic orientation change at each change in the cloud coverage.

According to another possibility of the invention, during step e), the servo-control of the orientation of the solar tracker is also carried out depending on an inclination angle called direct inclination angle established by an astronomical calculation of the Sun's position.

It is indeed interesting to take into account this direct inclination angle, to know the Sun's position and thus to consider a direct orientation facing the Sun in the servo-control logic of step e).

In this case, the present orientation angle of the aforementioned scenario can correspond to the direct inclination angle, and the servo-control will take into account the potential energy yield calculated in case of orientation change of the direct inclination angle to the predictive optimum inclination angle.

According to another possibility of the invention, during step e), the servo-control of the orientation of the solar tracker is also carried out depending on a wear rate of mechanical members of the solar tracker loaded during an orientation change of the solar tracker, starting from a present inclination angle until reaching a predictive optimum inclination angle established at a future instant during step d).

The invention also relates to a single-axis solar tracker orientable about an axis of rotation, of the type comprising a fixed structure for anchorage to the ground and a specific platform capable of supporting at least one solar collector, said platform being rotatably actuatable on the fixed structure about said axis of rotation by means of an actuation system, said solar tracker being noteworthy in that it further comprises an observation system of the evolution over time of the cloud coverage above the solar tracker and a control unit connected, on the one hand, to the observation system in order to receive its observations data and, on the other hand, to the actuation system in order to control the rotation of the platform, where said control unit is adapted to implement the steps b) to e) of the controlling method as described hereinbefore.

BRIEF DESCRIPTION OF DRAWINGS

Other features and advantages of the present invention will appear upon reading the detailed description hereinafter, of non-limiting examples of implementation, made with reference to the appended figures in which.

DETAILED DESCRIPTION

Figure 1:
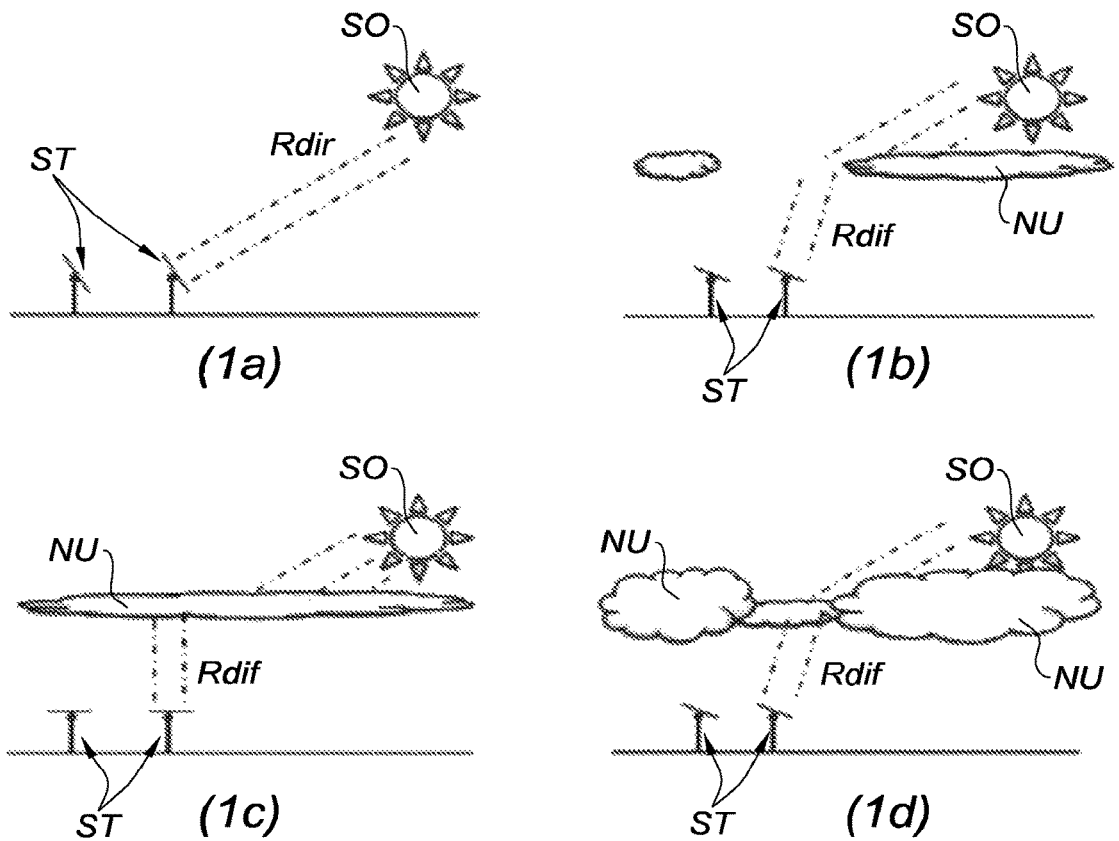
FIG. 1, already discussed, comprises four diagrams (1a), (1b), (1c) and (1d) each illustrating two solar trackers under different meteorological conditions.
Figure 2:
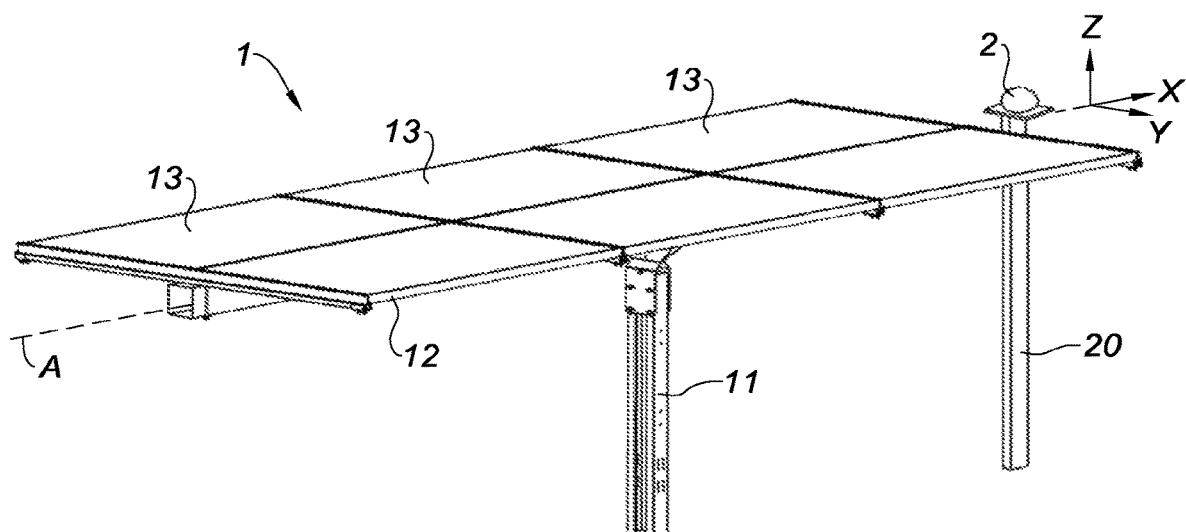
FIG. 2 is a schematic view of a single-axis solar tracker in accordance with the invention, where are illustrated the fixed structure and movable platform assembly and a system for observing the evolution over time of the cloud coverage.

Referring to FIG. 2, a single-axis solar tracker 1 orientable about an axis of rotation A, of the type comprising a fixed structure 11 for anchorage to the ground constituted by one or several pylon(s) anchored to the ground, for example by pile driving, screwing, bolting, ballasting, or any other equivalent means allowing fastening and stabilizing the fixed structure 11 to the ground.

The solar tracker 1 further comprises a movable platform 12 rotatably mounted on the fixed structure 11 about the axis of rotation A, and more specifically rotatably mounted on the upper ends of the pylon(s). This platform 12 is specific to support at least one solar collector 13, and in particular one or several photovoltaic panel(s).

Figure 7A:
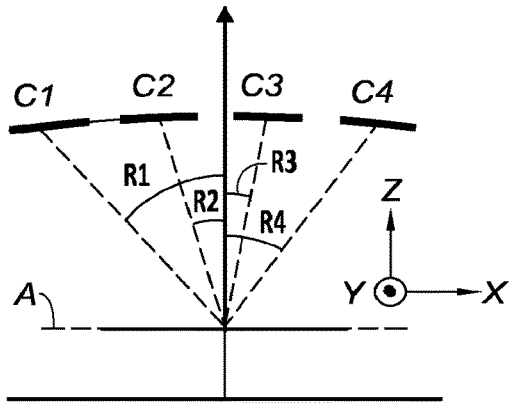
FIG. 7a is a schematic side view of four columns of a mapping of the solar luminance, with the azimuth angles associated to the different columns, in order to illustrate the calculation implemented for calculating an equivalent luminance value serving to determine the optimum inclination angle.
Figure 7B:
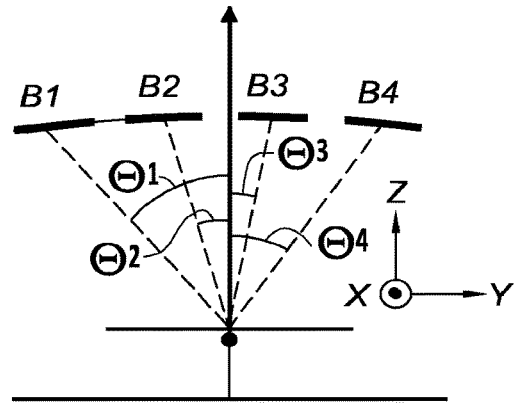
FIG. 7b is a schematic side view of four strips of a mapping of the solar luminance, with the elevation or inclination angles associated to the different strips, in order to illustrate the calculation implemented for calculating the perceived luminance value serving to determine the optimum inclination angle.

Referring to FIG. 2 and to FIGS. 7a and 7b, the axis of rotation A is substantially horizontal and directed according to a longitudinal axis X according to the north-south direction. When the solar tracker 1 is flat down (as shown in FIGS. 2, 7a and 7b) with its platform 12 laying horizontally, the platform 12 extends according to a horizontal plane defined by the longitudinal axis X and by a transverse axis Y according to the east-west direction, orthogonally to a vertical axis Z.

In the following description, the inclination angle of the solar tracker 1 (or inclination angle of the platform 12 and of the solar collector(s) 13) corresponds to the angle of the normal to the platform 12 with respect to the vertical axis Z considered in the plane (Y, Z). Thus, when the solar tracker 1 is flat down, this inclination angle is 0 degree.

The solar tracker 1 also comprises an observation system 2 of the cloud coverage above the solar tracker 1 or, in other words for observing the sky above the solar tracker 1. This observation system 2 may be associated to one single solar tracker 1 or, for economic reasons, may be shared with several solar trackers.

The observation system 2 is fixed, and may be raised with respect to the ground, for example by being mounted on a post 20.

The solar tracker 1 further comprises an actuation system (not illustrated in FIG. 2 and bearing the reference number 3 in FIG. 10) which ensures rotating the platform 12 about the axis of rotation A.

This actuation system 3 comprises an actuator, for example of the (electric, pneumatic or hydraulic) cylinder type or of the electric motor (for example rotary motor) type. This actuation system 3 further comprises a mechanical system for transmitting the movement at the output of the actuator (a rotational movement for a rotary motor, or a linear movement for a cylinder) into a rotational movement of the platform 12. As a non-limiting example, this mechanical transmission system may be a deformable-parallelogram system, a pulley system, a pinion system, a chain system, a belt system, a clutch system, a transmission shaft system, a connecting rod system, etc.

It is possible to consider that the actuator is specific to the solar tracker 1, or is shared between several solar trackers. In the case where the actuator is shared, the platforms 12 of the different solar trackers are advantageously coupled in rotation, for a synchronous rotation under the effect of the common actuator.

Figure 10:
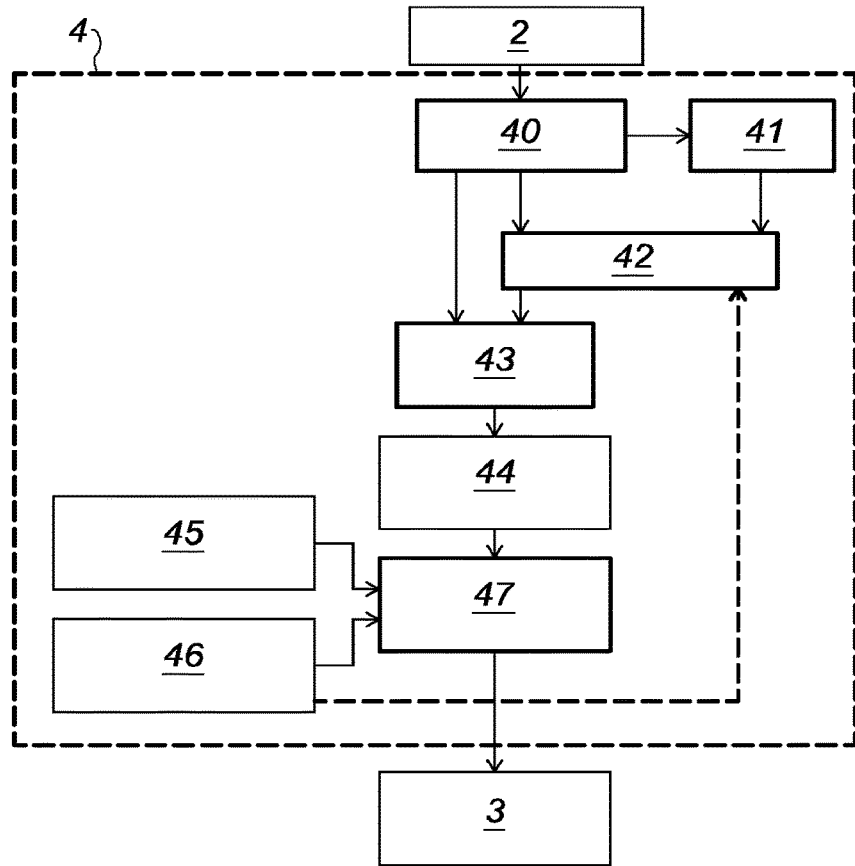
FIG. 10 is a representation in the form of a functional diagram of the functional elements used for the implementation of a controlling method in accordance with the invention.

Referring to FIG. 10, the solar tracker 1 also comprises a control unit 4 such as an electronic board, which is connected to the observation system 2 to receive its observations (or observations data) and which is also connected to the actuation system 3 in order to control its operation and accordingly control the rotation of the platform 12, in other words the orientation of the solar tracker 1.

This control unit 4 comprises several modules, namely:
- a cartographic module 40 provided to translate or convert each observation performed by the observation system 2 into a mapping of the solar luminance, by associating each mapping to a time instant;
- an archiving module 41 which archives each mapping generated by the cartographic module 40;
- a predictive calculation module 42 which calculates future evolution of the cloud coverage based on the prior observed evolution of the cloud coverage, and more precisely calculates predictive mappings of the solar luminance for future instants, this predictive calculation module 42 carrying out these calculations based on the mappings generated in real-time by the cartographic module 40 and based on the past mappings archived in the archiving module 41;
- an optimum inclination angle calculation module 43 which calculates the optimum inclination angle for each mapping generated in real-time by the cartographic module 40 (that is to say the optimum inclination angle at a present instant) and for each predictive mapping derived from the predictive calculation module 42 (in other words the optimum inclination angles for future instants);

an optimum inclination angle evolution module 44 which recovers all optimum inclination angles derived from the optimum inclination angle calculation module 43 in order to establish the evolution of the optimum inclination angle, and therefore to predict and anticipate the changes of the optimum inclination angle;

a parametrization module of the solar tracker 45 which comprises parameters relating to the speed of displacement of the actuation system 3 (and therefore to the speed necessary for an orientation change), parameters relating to the energy consumption necessary for the actuation system 3 for an orientation change, parameters relating to the solar energy production generated by the one or several solar collector(s) 13 depending on the received solar luminance, and parameters relating to a wear rate of the mechanical members of the solar tracker 1 loaded during an orientation change of the solar tracker 1, these parameters being in particular dependent on the angular deviation between the beginning and the end of an orientation change;

an astronomical calculation module 46 which calculates in real-time the Sun's position, and therefore the direct inclination angle defined by the direct solar radiation at the solar tracker 1;

a servo-control module 47 which calculates the servo-control of the orientation of the solar tracker 1, in other words the servo-control of its inclination angle depending on the evolution of the optimum inclination angle coming from the module 44, on the different parameters coming from the module 45 and on the direct inclination angle coming from module 46, where this servo-control module 47 outputs an angular setpoint to the actuation system 3 in order to control the orientation changes of the platform 12 of the solar tracker 1.

It should be noted that this control unit 4 may be specific to the solar tracker 1, or shared between several solar trackers, and preferably between several solar trackers arranged in line (extending from north to south) within linear solar plants.

Figure 3:
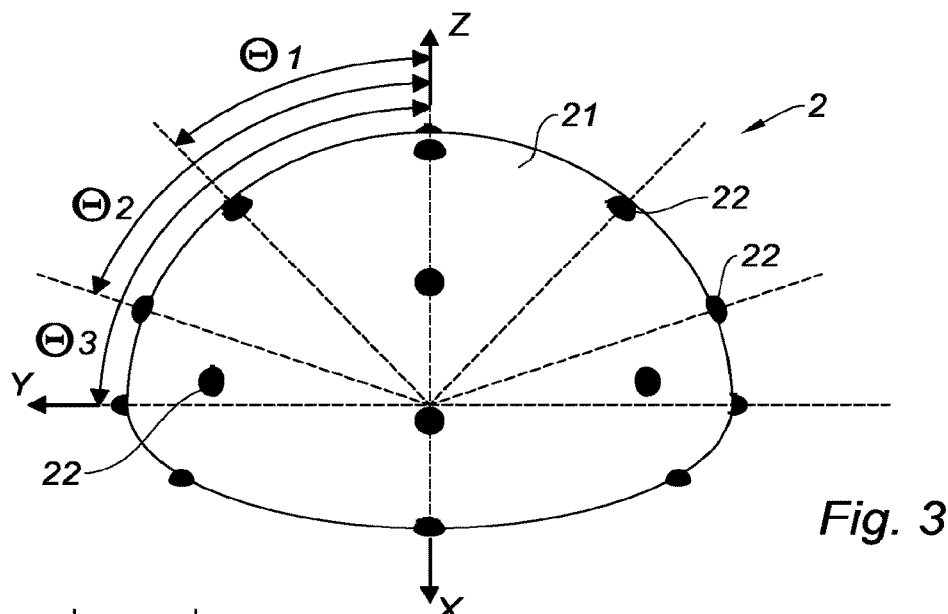
FIG. 3 is a schematic view of a first example of observation system.

In a first embodiment illustrated in FIG. 3, the observation system 2 comprises a support 21, in particular a full dome shaped support, supporting photosensitive cells 22.

These photosensitive cells 22 are positioned along several strips (or lines) distributed at several angles called elevation angles 74 i which are measured with respect to the vertical axis Z in the plane (Y, Z), the reference frame (X, Y, Z) being centered on the center 0 of the full dome 21. Hence, the elevation angle θi is to be matched with the inclination angle of the solar tracker 1. In the example of FIG. 3, the photosensitive cells 22 are distributed according to six strips at elevation angles of θ, +θ1, +θ2, +θ3, -θ1, -θ2 and -θ3; for example with [θ1]=30 degrees, [θ2]=60 degrees and [θ3]=90 degrees. These elevation angles θi are also shown in FIG. 7b.

On each strip are present one or even several photosensitive cells 22, In case of a strip with several photosensitive cells, the photosensitive cells 22 of the same strip are distributed according to several angles called azimuth angles Rj which are measured with respect to the vertical axis Z in the plane (X, Z). Thus, besides being distributed along the strips at different elevation angles θi, the photosensitive cells 22 are also distributed according to columns at different azimuth angles Rj. These azimuth angles Rj are shown in FIG. 7a.

Generally, the more the first observation system 2 comprises photosensitive cells 22, and in particular the more the observation system 2 comprises strips of photosensitive cells 22, the better will be the resolution of the angular accuracy.

These photosensitive cells 22 may be of the same technology as the photovoltaic panels 13 in order to enable the application of a weighting depending on the useful wavelength range of the photovoltaic panels 13. Preferably, these photosensitive cells 22 will undergo a prior calibration in order to obtain a better accuracy.

Thus, with such an observation system 2, by recovering the measurements of the luminosity of each photosensitive cell 22 and by knowing the elevation angles 74 i (or associated inclination angles) of the different strips and the azimuth angles Rj of the different columns, the cartographic module 40 converts an observation performed by the observation system 2 into a mapping 5 of the solar luminance.

This mapping 5 constitutes a bidimensional mapping in the sense that it forms a solar luminance map (or matrix) distributed according to:

several strips 50(i) (i being an integer) established according to a first direction parallel to the axis of rotation A (therefore parallel to the axis X), and associated respectively to different elevation or inclination angles θi, so that each strip 50(i) corresponds to an inclination angle θi of the solar tracker 1 and several columns 51(j) (j being an integer) established according to a second direction horizontal and orthogonal to the axis of rotation A (and therefore parallel to the axis Y) and associated respectively to different azimuth angles Rj.

Thus, the mapping 5 comprises N boxes (where N corresponds to the number of photosensitive cells 22 and N=[i×j]) and an (absolute or relative) solar luminance value Lum(i, j) corresponds to each box.

Figure 4:
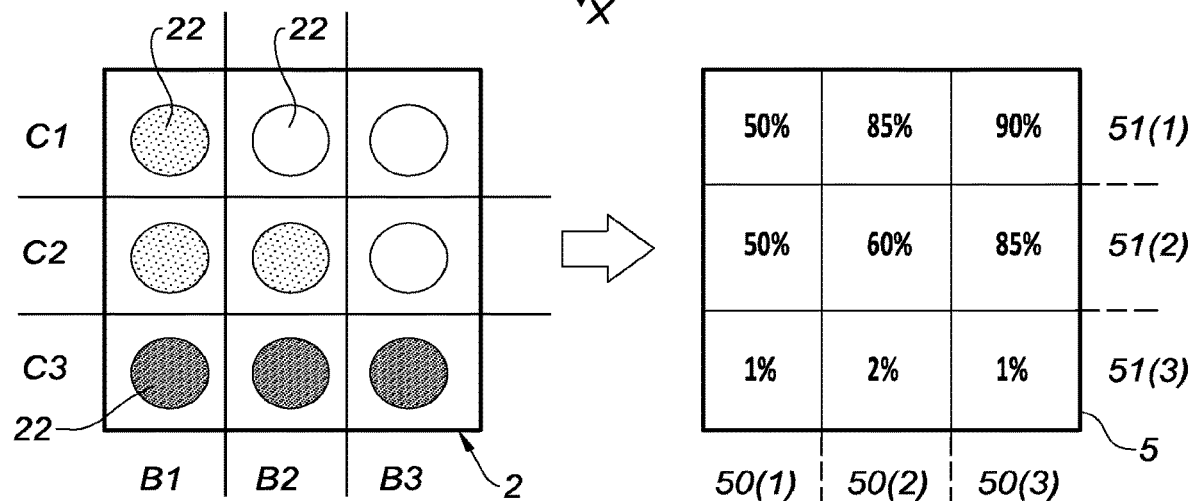
FIG. 4 is a flat down schematic representation of a first observation system equivalent to that of FIG. 3, and of a mapping of the solar luminance (to the right) derived from such an observation system.

In FIG. 4 to the left, an example of the first observation system 2 is schematically illustrated flat down and comprises nine photosensitive cells 22 distributed according to three strips B1, B2, B3 which are associated to three elevation angles (or inclination angles), and according to three columns C1, C2, C3 which are associated to three azimuth angles. To this first observation system 2 corresponds a mapping 5 with three strips 50(1), 50(2), 50(3) and three columns 51(1), 51(2), 51(3), and where the solar luminance values are expressed in a relative manner as a percentage.

Figure 5:
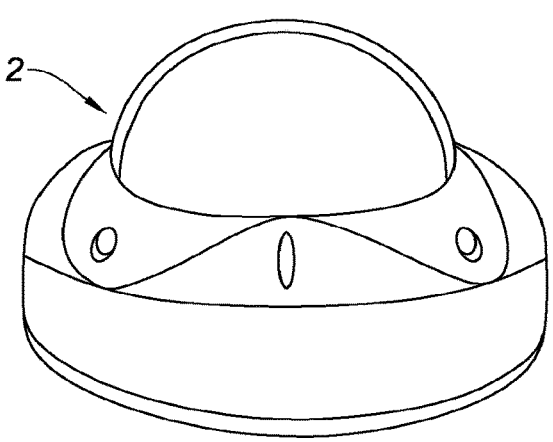
FIG. 5 is a schematic view of a second example of observation system.

In a second embodiment illustrated in FIG. 5, the observation system 2 comprises a camera, in particular a hemispherical camera, in order to extract images from the sky.

Advantageously, the second observation system 2 (called camera in the following) is adapted to take images in a spectral band sufficient for the technology of the solar collectors 13, and in particular of the photovoltaic panel(s).

Figure 6:
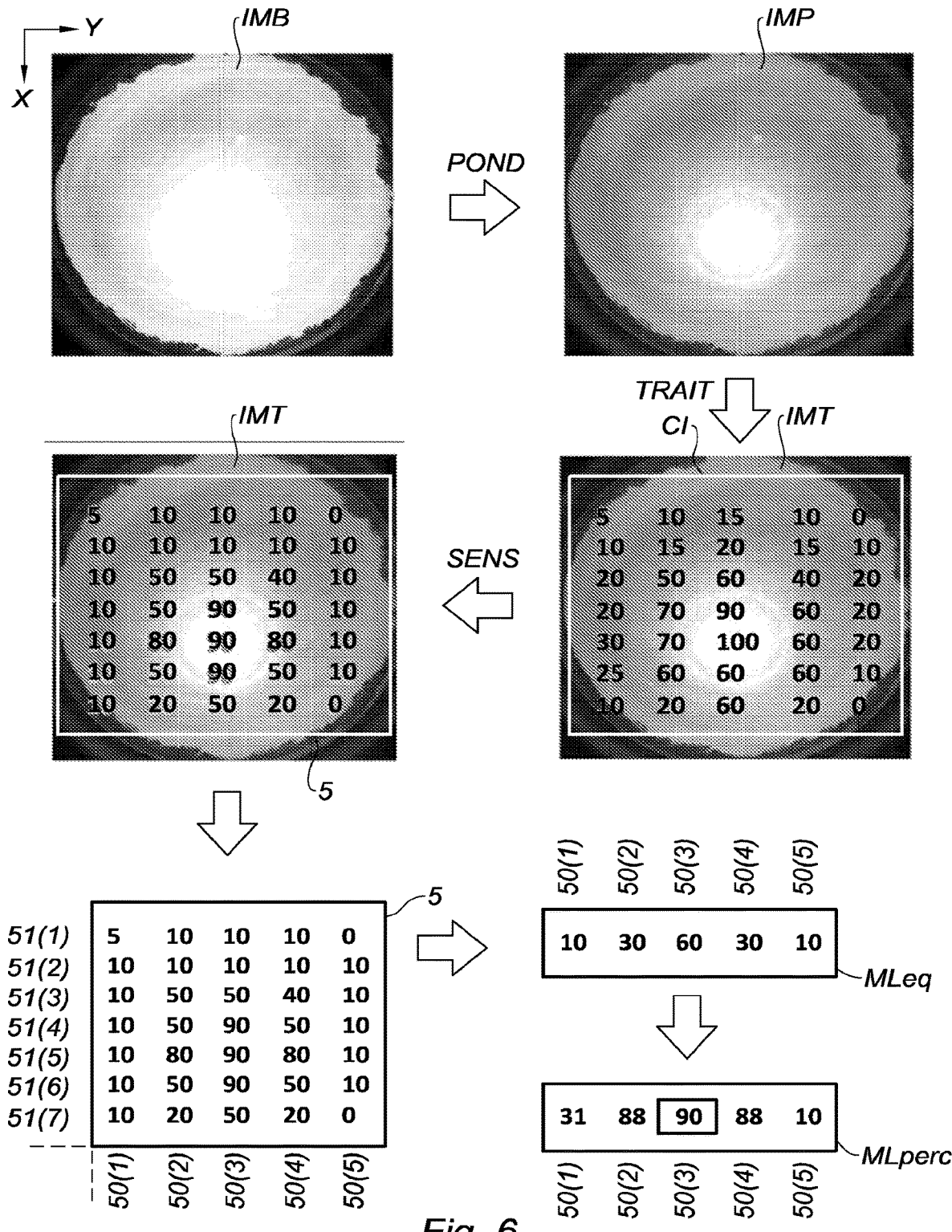
FIG. 6 is a schematic representation of an observation (at the top left) performed by an observation system equivalent to that of FIG. 5, and of a mapping of the solar luminance (at the bottom left) derived from such an observation, after several image processing steps, and of an equivalent matrix of luminance values (at the bottom right) derived from this mapping.

Referring to FIG. 6, the camera 2 delivers a raw image IMB of the sky which is delivered afterwards to the cartographic module 40 to convert this raw image IMB (or observation) into a bidimensional mapping 5 of the solar luminance. A reference frame (X, Y) is associated to this bidimensional raw image IMB, these axes X and Y having already been defined hereinbefore.

The cartographic module 40 implements a succession of image processing steps starting from the raw image IMB until the mapping 5.

At a first step POND, the cartographic module 40 implements a frequency weighting applied on the recovered raw image IMB (or video signal), in order to obtain an image called weighted image IMP; this frequency weighting consisting in applying a frequency filter on the observation (whether the observation performed by the photosensitive cells 22 or performed by the camera) which depends on both the frequency response of the observation system 2 (whether the photosensitive cells 22 or the camera) and the useful frequency band (or spectral response) of the photovoltaic panels 13.

At a second step TRAIT, the cartographic module 40 implements a processing of the weighted image IMP consisting in correcting the image from defects (noise suppression processing, blooming processing, saturation processing...) in order to obtain an image called processed image IMT. Then, the cartographic module 40 implements a calculation (whether pixel by pixel, or area by area where each area comprises several pixels) of the distribution of the solar luminance on the processed image IMT in order to generate an initial mapping CI forming a map (or matrix) of solar luminance distributed according to several strips associated respectively to different elevation or inclination angles 0(i) and according to several columns associated respectively to different azimuth angles; such an initial mapping being equivalent to that already described hereinabove. In FIG. 6, the solar luminance values of the initial mapping CI are expressed in a relative manner as a percentage.

At a third step SENS, the mapping module 40 applies on the initial mapping CI a coefficient depending on the variation of the sensitivity of the camera 2, in order to generate a mapping 5 of the same type as the mapping described hereinabove. Indeed, the magnitude (or luminosity) of the data delivered by the camera 2 is proportionally related to the value of the solar radiation, so that this coefficient takes into account this proportionality depending on the variation of the sensitivity of the camera 2.

Thus, the mapping module 40 generates a mapping 5 forming a map (or matrix) of solar luminance distributed according to several strips $50(i)$ associated respectively to different elevation or inclination angles 74 i and according to several columns $51(j)$ associated respectively to different azimuth angles Rj. In the example of FIG. 6, the mapping 5 comprises five strips 50(1), ..., 50(5) and seven columns 51(1), ..., 51(7), and the solar luminance values are expressed in a relative manner as a percentage.

The resolution of the mapping 5 (in other words the number of strips and columns) and therefore the angular accuracy depend on the fineness of the image processing implemented by the cartographic module 40, and also on the sensitivity and on the resolution of the observation system 2. For the first observation system 2 with photosensitive cells 22, this sensitivity depends on the sensitivity of the photosensitive cells 22, and this resolution depends on the number and on the distribution of the photosensitive cells 22. For the second observation system 2 of the camera type, this sensitivity and this resolution depend on the quality of the camera.

Starting from such a mapping 5 (whether it is derived from either one of the observation systems 2 described hereinabove), the optimum inclination angle calculation module 43 implements a calculation based on this mapping 5 in order to extract an optimum inclination angle (θopt) which corresponds to the inclination angle (or elevation angle) to which is associated a maximum of solar luminance.

For this calculation, and with reference to FIGS. 6 and 7, the optimum inclination angle calculation module 43 implements a succession of sub-steps. This succession of sub-steps constitutes an example of calculation or algorithm mode, and the invention would not of course be restricted to this example.

In a first sub-step, the optimum inclination angle calculation module 43 calculates, for each strip $50(i)$ of the mapping 5, an equivalent luminance value Leq(i) from the set of luminance values L(i, j) taken in the strip $50(i)$. For each strip $50(i)$, the equivalent luminance value Leq(i) of the strip $50(i)$ is a function of the luminance values L(i, j) taken in the strip $50(i)$ and of the azimuth angles Rj of the different columns $51(j)$ according to the following formula (with reference to FIG. 7a):

$$Leq(i) = \sum_j Lum(i, j) \times \cos Rj$$

A matrix MLeq of the equivalent luminance values Leq(i) associated to the different strips $50(i)$ is thus obtained.

In a second sub-step, the optimum inclination angle calculation module 43 calculates, for each strip $50(i)$ of the mapping 5, a perceived luminance value Lperc(i) by the tracker support 1 from equivalent luminance values Leq(i) calculated for all strips during the first sub-step, and from the inclination (or elevation) angles 74 i associated to the strips $50(i)$, according to the following formula (with reference to FIG. 7b):

$$Lperc(i) = \sum_k Leq(k) \times \cos(\theta i - \theta k) \times p(i, k)$$

where $p(i, k) = 1$ if $abs(\theta i - \theta k) < 90$ degrees, and $p(i, k) = 0$ else.

The coefficient takes into account, beyond an angular deviation of 90 degrees, the radiation is not received by the plane solar collector(s).

Thus, a matrix MLperc of the perceived luminance values Lperc(i) associated with the different strips $50(i)$ is obtained.

In a last sub-step, the optimum inclination angle calculation module 43 retains the optimum inclination angle θopt as the inclination (or elevation) angle associated to the strip having the highest perceived luminance value Lperc(i).

The predictive calculation module 42 calculates the predictive mappings 6 of the solar luminance for future instants (t+nP), where n is a non-zero integer and P the period of observation performed periodically and repeatedly by the observation system 2. These predictive mappings 6 are established based on the mapping 5 generated in real-time by the cartographic module 40 and based on the past mappings 5 archived in the archiving module 41.

Figure 8:
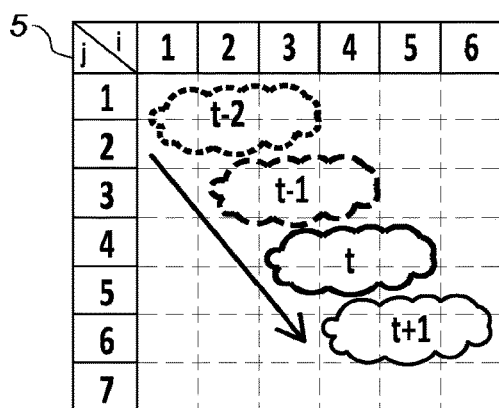
FIG. 8 comprises four diagrams (8a), (8b), (8c) and (8d) each illustrating an image with the representation of a cloud observed at a past instant (t−2), of the same image observed at a past instant (t−1), of the same image observed at a present instant (t) and of the same image predicted by predictive calculation at a future instant (t+1)
Figure 8:
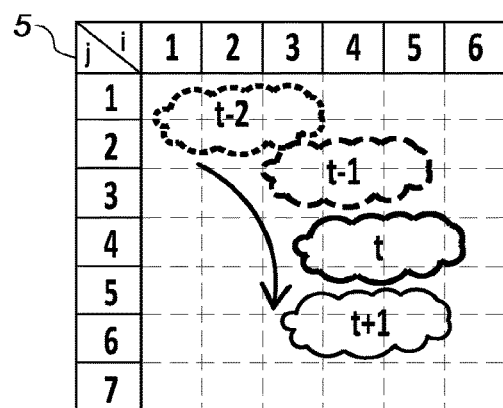
Figure 8:
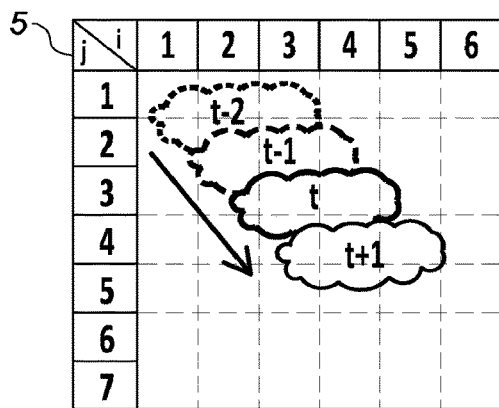
Figure 8:
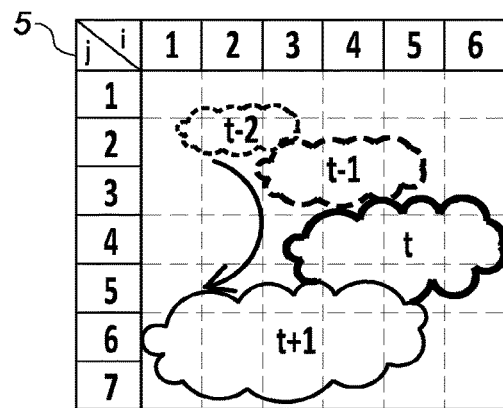

FIG. 8 illustrates four examples of situation of a cloud coverage evolving therein, with four diagrams 8a, 8b, 8c and 8d each representing an image with the representation of a cloud observed at a past instant (t−2), of the same cloud observed at a past instant (t−1), of the same cloud observed at a present instant (t) and of the same cloud predicted by predictive calculation at a future instant (t+1) (the period P is 1 in FIG. 8).

The predictive calculation is based on a consideration of the past evolution of the solar luminance, between several past instants and the present instant, and in particular the evolution of the distribution of the solar luminance and the speed of evolution of the solar luminance.

This predictive calculation can be based on a sliding time window, that is to say a window comprising a predefined number of the last past mappings.

This predictive calculation is used to establish short-term predictive mappings 6 (or predictions of mapping). As a non-limiting example, the short-term concept covers calculations on a future horizon of a maximum of ten to thirty minutes, or even a maximum of one to two hours. It is of course possible to provide longer-term predictive calculations.

The algorithm implemented for such a predictive calculation may possibly integrate improvements such as:
- the consideration of the prediction errors to improve the future predictions (indeed, it is possible to compare these mappings with the cartographic predictions performed earlier in order to draw lessons therefrom on the predictive calculation and to improve it);
- identifying the types of cloud depending on the mapping thanks to a database and/or thanks to analyses and plots performed in the past, so as to allow making long-term predictions depending on the types of clouds.

The algorithm implemented for such a predictive calculation may also take into account the evolution of the Sun's position in the sky, in particular when the predictive calculation is performed at future instants sufficiently distant (for example beyond 30 minutes) so that the change of the Sun's position has an influence on the evolution of the solar luminance. This consideration of the Sun's position in the predictive calculation is illustrated by the linking arrow in dotted line in FIG. 10 between the predictive calculation module 42 and the astronomical calculation module 46.

Figure 9:
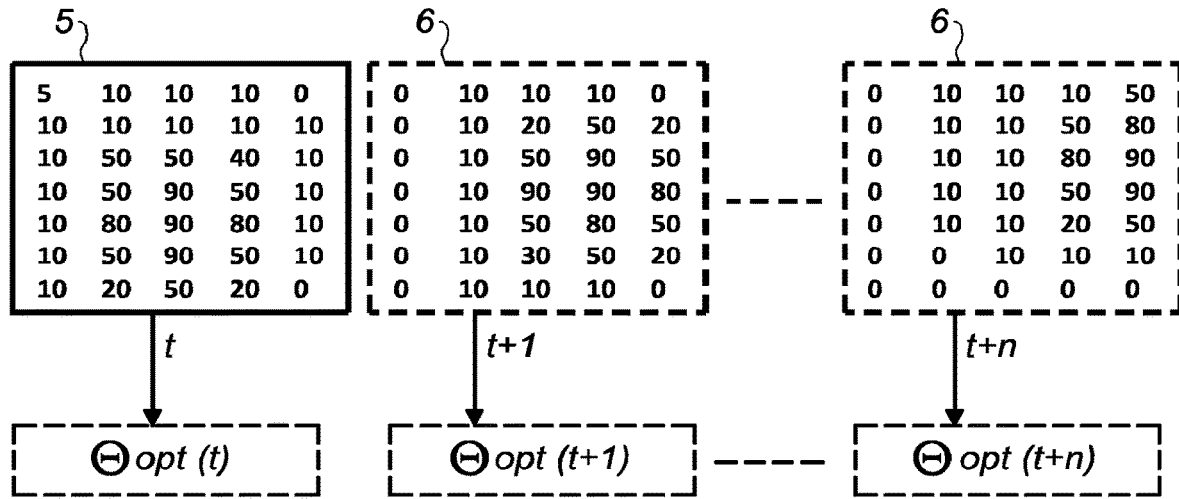
FIG. 9 shows three mappings of the solar luminance, to which are associated the corresponding optimum inclination angles, including a mapping at a present instant (t) and two predictions of mapping at future instants (t+1) and (t+n)

As shown in FIG. 9, the predictive calculation module 42 establishes predictive mappings 6, and to each predictive mapping 6 is associated a predictive optimum inclination angle θopt calculated by the optimum inclination angle calculation module 43 using the same calculation method described above.

Thus, the optimum inclination angle evolution module 44 recovers all the optimum inclination angles (those of the past mappings, those of the present mapping, and those of the predictive mappings 6) and establishes a future evolution of the optimum inclination angle θopt and thus to predict and anticipate the changes of the optimum inclination angle Finally, the servo-control module 47 servo-controls the orientation of the solar tracker 1 depending on the past and future evolution of the optimum inclination angle θopt, and also depending on the energy consumption Cons necessary to modify the orientation of the solar tracker 1, on the speed of displacement in rotation of the solar tracker 1, and the production of additional solar energy Prod obtained with an orientation change.

Figure 11:
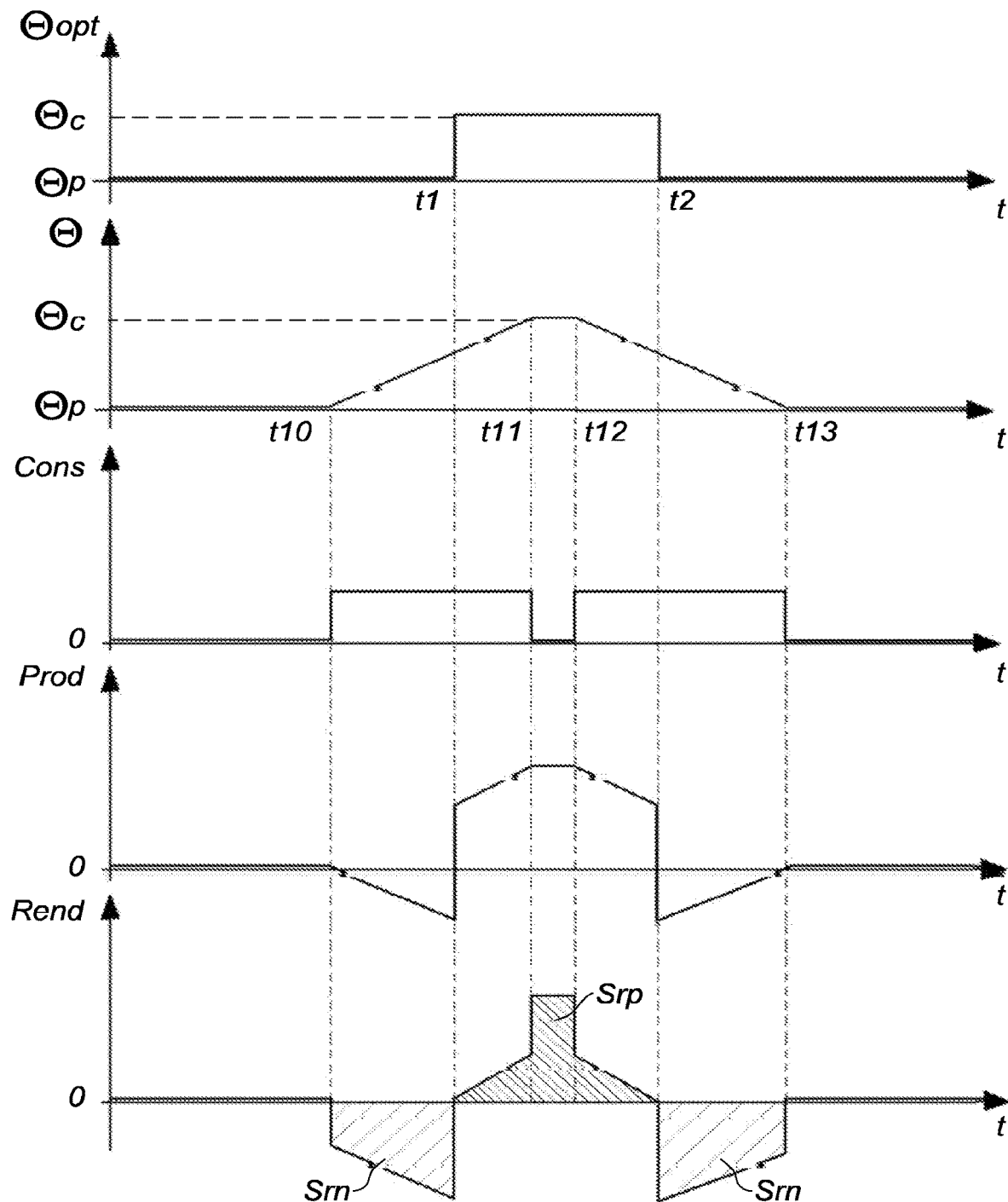
FIG. 11 shows five predictive curves calculated for a first potential scenario defined during the servo-control step e), with from the top to the bottom, an evolution curve of the future (or predictive) optimum inclination angle calculated during step d), an evolution curve of the inclination angle of the solar tracker, an evolution curve of the energy consumption necessary to modify the orientation of the solar tracker, an evolution curve of the expected additional solar energy consumption, and an evolution curve of the expected energy yield.
Figure 12:
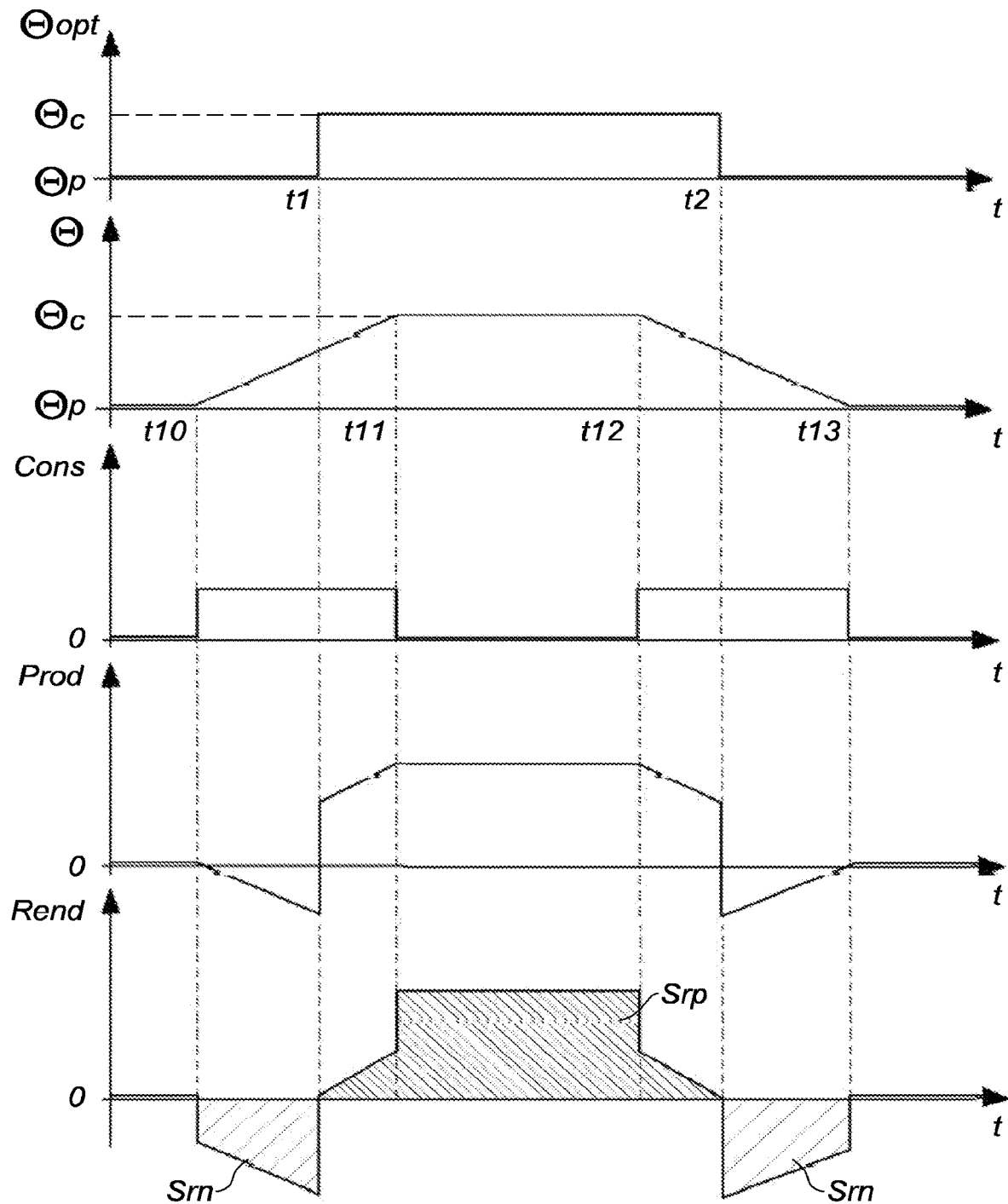
FIG. 12 shows five predictive curves (similar to those of FIG. 11) calculated for a second potential scenario.

With reference to FIGS. 11 and 12, the servo-control module 47 is based on the future evolution of the optimum inclination angle θopt (first curve from the top).

In the given example, the predictive optimum inclination angle θopt changes in value to reach a target value θc, for example due to a prediction of passage of a cloud in front of the Sun, from the future instant t1 to a future instant t2, before returning to its initial value.

The servo-control module 47 establishes a potential scenario during which the inclination angle θ of the solar tracker 1 is modified starting from a present inclination angle θp until reaching the future or predictive optimum inclination angle, in this case following the prediction of evolution of the optimum inclination angle.

In the given example, the scenario consists in servo-controlling the inclination angle θ on the first curve, and this servo-control depends on the speed of displacement in rotation of the solar tracker 1, in order to obtain a second evolution curve of the inclination angle θ of the solar tracker 1 during the orientation change of the scenario. Indeed, the solar tracker 1 has a displacement time necessary to get to reach the target optimum inclination angle θc.

Thanks to the predictive calculation, the displacement of the solar tracker 1 is anticipated, in this case by starting earlier at the instant t10 (prior to t1) until reaching the target value θc at t11 (subsequent to t1), then by starting by anticipation the return to the instant t11 (prior to t2) until returning to the present inclination angle θp at the instant t13 (subsequent to t2).

The servo-control module 47 determines the evolution of the energy consumption Cons necessary to modify the orientation of the solar tracker according to the second curve, in order to obtain a third evolution curve of this energy consumption Cons; the solar tracker 1 consuming during the orientation change phase, between the instants t10 and t11 then between the instants t12 and t13.

The servo-control module 47 determines the evolution of the additional production Prod (or gain of production) expected following the second evolution curve of the inclination angle θ rather than remaining at the present inclination angle θp, in order to obtain a fourth curve of the evolution of this production Prod. Therefore, this additional production Prod corresponds to the gain of production expected if the scenario is followed rather than remaining in the initial or present situation at this angle θp.

In the given example, the production Prod is negative between the instants t10 and t1 and between the instants t2 and t13 which correspond to periods where the inclination angle θ moves away from the inclination angle θopt, and the production Prod is positive between the instants t1 and t2 which correspond to a period where the inclination angle θ matches or even is equal to the inclination angle θopt.

The servo-control module 47 determines the evolution of the energy yield Rend expected based on the difference between the production Prod and the energy consumption Cons, giving a fifth curve corresponding to the difference between the fourth curve and the third curve, in other words Rend=Prod−Cons.

In the given example, the yield Rend is negative between the instants t10 and t1 and between the instants t2 and t13, and the yield Rend is positive between the instants t1 and t2.

Finally, the servo-control module 47 follows the scenario (in other words servo-controls the solar tracker according to the second curve) if the energy yield is generally positive for the scenario, else the orientation of the solar tracker 1 is held at the inclination angle θp.

The overall energy yield is established by studying the yield throughout the scenario period.

In the example of FIG. 11, the overall yield is negative, because the sum of the surfaces Srn where the yield is negative (between t10 and t1 and between t2 and t13) is greater than the surface Srp where the yield is positive (between t1 and t2). The example in FIG. 11, corresponds for example to a situation where the predictive passage time (corresponding to the interval [t2−t1]) of a cloud in front of the Sun is too short compared to the time necessary for an orientation change (corresponding to the interval [t1−t10] or [t13−t2]).

In the example of FIG. 12, the overall yield is positive, because the sum of the surfaces Srn where the yield is negative (between t10 and t1 and between t2 and t13) is lower than the surface Srp where the yield is positive (between t1 and t2). The example of FIG. 12 corresponds for example to a situation where the predictive passage time (corresponding to the interval [t2−t1]) of a cloud in front of the Sun is long compared to the time necessary for an orientation change (corresponding to the interval [t1−t10] or [t13−t2]).

Thus, in the example of FIG. 11, the servo-control module 47 does not follow the scenario and maintains the orientation at the present value θp, while in the example of FIG. 12, the servo-control module 47 follows the scenario and ensures a servo-control of the inclination angle according to the second curve.

Of course, the example of implementation mentioned hereinabove is not limiting and other improvements and details may be added to the solar tracker according to the invention, nevertheless without departing from the scope of the invention where other types of fixed structure or platform may be for example carried out.

The invention claimed is:

1. A method for controlling orientation of a single-axis solar tracker orientable about a single axis of rotation, the method comprising:
   translating cloud coverage data, which includes an evolution over time of cloud coverage above the single-axis solar tracker into a plurality of multidimensional mappings of solar luminance;
   determining, for each of the plurality of multidimensional mappings, an optimum inclination angle associated with a maximum solar luminance on the multidimensional mapping;
   predicting at each current instant at least a predictive multidimensional mapping of the solar luminance at a future instant based on an evolution of a distribution of the solar luminance on multidimensional mappings established at a plurality of past instants;
   calculating, for each predictive multidimensional mapping, a predictive optimum inclination angle at a future instant associated with a maximum of the solar luminance on the predictive multidimensional mapping; and
   changing the orientation of the single-axis solar tracker to a new orientation based on a prior evolution of the optimum inclination angle and a future evolution of the optimum inclination angle.

2. The method according to claim 1, wherein each of the plurality of multidimensional mappings is a bidimensional mapping established according to a first direction and a second direction,
   wherein the bidimensional mapping constitutes a solar luminance map distributed according to strips parallel to the first direction and associated respectively with different elevation angles and according to columns parallel to the second direction and associated respectively with different azimuth angles, each strip accordingly corresponding to an inclination angle of the single-axis solar tracker, and
   wherein the optimum inclination angle of the single-axis solar tracker is calculated for each bidimensional mapping by:
   calculating for each strip an equivalent luminance value from a set of luminance values taken in the strip;
   calculating for each strip a luminance value perceived by the single-axis solar tracker from equivalent luminance values calculated for the strips and from inclination angles associated with the strips; and
   retaining the optimum inclination angle as the inclination angle associated with the strip having the highest perceived luminance value.

3. The method according to claim 2, wherein the first direction is parallel to the axis of rotation of the single-axis solar tracker and the second direction is horizontal and orthogonal to the first direction.

4. The method according to claim 1, further comprising obtaining cloud coverage data above the single-axis solar tracker by picking up sky images from the ground using an image pickup apparatus, measuring the solar luminance from the ground using at least one photosensitive cell, or obtaining satellite images of the sky above the single-axis solar tracker.

5. The method according to claim 1, further comprising applying a frequency weighting to the cloud coverage data, which is a function of both a frequency response of an observation system and a useful frequency band of a solar collector supported by the single-axis solar tracker.

6. The method according to claim 1, wherein:
   the cloud coverage is observed periodically at a plurality of consecutive, present instants t and a multidimensional mapping is associated with each instant t;
   at each present instant t, a predictive multidimensional mapping at a future instant t+nP, where n is non-zero integer and P corresponds to a period between two consecutive observations, is calculated based on the plurality of multidimensional mappings established at several past instants t−mP, where m is a non-zero integer; and
   a predictive optimum inclination angle is calculated for each predictive multidimensional mapping at a future instant t+nP.

7. The method according to claim 1, wherein the optimum inclination angle for a predictive multidimensional mapping is calculated according to a calculation method equivalent to the calculation method used for calculating the optimum inclination angle for a multidimensional mapping.

8. The method according to claim 1, wherein the new orientation of the single-axis solar tracker is also based on an energy consumption necessary to modify the orientation of the single-axis solar tracker by starting from a present inclination angle until reaching a predictive optimum inclination angle established at a future instant.

9. The method according to claim 8, wherein the inclination angle of the single-axis solar tracker is modified, starting from the present inclination angle until reaching the predictive optimum inclination angle at a future instant by:
   calculating an evolution of the inclination angle of the single-axis solar tracker during a change in the orientation starting from the present inclination angle until reaching the predictive optimum inclination angle, wherein the evolution of the inclination angle is based on a speed of displacement in rotation of the single-axis solar tracker;
   calculating an evolution of energy consumption necessary to modify the orientation of the single axis solar tracker;
   calculating an evolution of additional solar energy production expected with the change in the orientation;
   calculating an evolution of an expected energy yield based on a difference between the evolution of the additional solar energy production and the evolution of the energy consumption; and
   if the evolution of the expected energy yield is generally positive, changing the orientation of the single-axis solar tracker to the predictive optimum inclination angle.

10. The method according to claim 9, wherein the new orientation of the single-axis solar tracker is also based on a direct inclination angle established by an astronomical calculation of the Sun's position.

11. The method according to claim 10, wherein the present inclination angle corresponds to the direct inclination angle.

12. The method according to claim 1, wherein the new orientation of the single-axis solar tracker is also based on a wear rate of mechanical members of the single-axis solar tracker loaded for an orientation change of the single-axis solar tracker by starting from a present inclination angle until reaching a predictive optimum inclination angle established at a future instant.

13. A single-axis solar tracker orientable about an axis of rotation, comprising:
  a fixed structure for anchorage to a ground;
  a platform rotatably coupled to the fixed structure along the axis of rotation and configured to support at least one solar collector;
  an actuation system configured to drive rotation of the platform about the axis of rotation;
  a controller in communication configured to receive cloud coverage observation data and in communication with the actuation system to control the rotation of the platform, the controller configured to:
  translate cloud coverage data, which includes an evolution over time of cloud coverage above the single-axis solar tracker into a plurality of multidimensional mappings of solar luminance;
  determine, for each of the plurality of multidimensional mappings, an optimum inclination angle associated with a maximum solar luminance on the multidimensional mapping;
  predict at each current instant at least a predictive multidimensional mapping of the solar luminance at a future instant based on an evolution of a distribution of the solar luminance on multidimensional mappings established at a plurality of past instants;
  calculate, for each predictive multidimensional mapping, a predictive optimum inclination angle at a future instant associated with a maximum of the solar luminance on the predictive multidimensional mapping; and
  cause the actuation system to change the orientation of the platform to a new orientation based on a prior evolution of the optimum inclination angle and a future evolution of the optimum inclination angle.

14. The single-axis solar tracker according to claim 13, further comprising an observation system configured to observe an evolution over time of a cloud coverage over the solar tracker to obtain the cloud coverage data.

15. The single-axis solar tracker according to claim 14, wherein the observation system is an image pickup apparatus configured to capture sky images or a plurality of photosensitive cells configured to measure solar luminance.

16. The single-axis solar tracker according to claim 15, wherein the image pickup apparatus is a camera.

17. The single-axis solar tracker according to claim 13, wherein the controller is configured to obtain satellite images of the sky above the single-axis solar tracker.

\* \* \* \* \*